Patented Sept. 10, 1929.

1,727,674

UNITED STATES PATENT OFFICE.

CHARLES V. ROSENBERGER, OF INDEPENDENCE, IOWA.

METHOD OF DRESSING POULTRY.

No Drawing.     Application filed October 4, 1927.  Serial No. 224,025.

This invention relates to improvements in methods of dressing poultry, and has particular reference to the removal of feathers, hair, down and extraneous matter from the poultry.

One object of the invention is to provide an economical method of effectually removing feathers, hair, down, dirt and blood from poultry and to reduce to a minimum the "barking" or the "burning" of the flesh such as has occurred in methods heretofore employed in picking feathers from the poultry or rubbing in an effort to remove the fine hair and down.

A further object is to so facilitate the dressing of poultry that the feathers, down, hair and extraneous matter shall be effectually removed without injury to the flesh of the poultry and that the flesh of the poultry shall present a clean and smooth appearance.

With these and other objects in view, the invention consists in certain steps in the method of dressing poultry as hereinafter set forth and pointed out in the claims.

I prefer first to remove the quill feathers and a considerable portion of the body feathers from the poultry in any preferred manner. I then coat the poultry, preferably by dipping, with a waxy and adhesive material. The coating material which I have found to be effective comprises paraffin, beeswax, Batavia gum damar, in the proportions approximately of twenty pounds of paraffin to one pound of beeswax and one pound of Batavia gum damar. The Batavia gum damar serves to increase the adhesive property of the compound. The materials will be melted and mixed and while the waxy compound is in a melted condition, the poultry will be dipped into the same so that it will become coated. After permitting the waxy coating to congeal or to become solidified or partly solidified, the waxy coating will adhere to the pin feathers, hair, down and dirt so as to facilitate the subsequent ready removal of the same. The congealed waxy coating will be removed from the poultry and will carry with it the pin feathers, hair, down, blood and dirt,—leaving the flesh smooth and clean.

While I have described the waxy and adhesive material which I prefer to use, still the compounds described may be varied as to relative proportions and other waxy and adhesive material might be employed without departing from the spirit of my invention or limiting its scope.

Having fully described my invention what I claim as new and desire to secure by Letters Patent, is:—

1. The herein described method of dressing poultry consisting in plucking such part of the feathers as may readily be so removed, then applying to the carcass, a coating of a melted waxy and adhesive material, permitting said material to substantially solidify, and finally removing said material and with it, feathers, down, hair and extraneous material from the carcass.

2. The herein described method of dressing poultry, consisting in coating the same with a melted waxy and adhesive compound consisting of approximately twenty parts of paraffin to one part of beeswax, and one part of Batavia gum damar, permitting said compound to substantially solidify on the poultry carcass, and then removing said compound to remove feathers, down, hair and extraneous matter from said carcass.

3. The method of treating poultry carcasses, which consists in plucking in any preferred manner such part of the feathers as may readily be so removed, then applying to the carcass a melted fluid adhesive material, allowing the material to substantially solidify, and then removing the said material and with it all epidermal excrescences such as feathers, down, and pinfeathers adherent thereto or embedded therein.

4. In the poultry dressing art, and as a substitute for singeing, the method of removing remanent feathers, down, and pinfeathers from carcasses after preliminary plucking, which consists in applying fluid adhesive thereto, allowing the same to substantially solidify, and then removing the adhesive, together with the adherent epidermal excrescences, such as enumerated.

In testimony whereof, I have signed this specification.

C. V. ROSENBERGER.